United States Patent
Kunert

(10) Patent No.: US 9,689,433 B2
(45) Date of Patent: Jun. 27, 2017

(54) GEARED MOTOR SERIES

(71) Applicant: Siemens Aktiengesellschaft, München (DE)

(72) Inventor: Jens Kunert, Tübingen (DE)

(73) Assignee: Siemens Aktiengesellschaft, München (DE)

( * ) Notice: Subject to any disclaimer, the term of this patent is extended or adjusted under 35 U.S.C. 154(b) by 216 days.

(21) Appl. No.: 14/395,000

(22) PCT Filed: Mar. 22, 2013

(86) PCT No.: PCT/EP2013/056050
§ 371 (c)(1),
(2) Date: Oct. 16, 2014

(87) PCT Pub. No.: WO2013/156248
PCT Pub. Date: Oct. 24, 2013

(65) Prior Publication Data
US 2015/0086264 A1    Mar. 26, 2015

(30) Foreign Application Priority Data

Apr. 17, 2012  (EP) .................................... 12164440

(51) Int. Cl.
*F16D 1/06* (2006.01)
*F16D 1/072* (2006.01)
(Continued)

(52) U.S. Cl.
CPC ........... *F16D 1/072* (2013.01); *F16H 57/033* (2013.01); *F16H 2057/02069* (2013.01); *F16H 2057/0335* (2013.01); *Y10T 403/49* (2015.01)

(58) Field of Classification Search
CPC ............ Y10T 403/49; Y10T 403/7026; Y10T 29/49945; Y10T 29/49963; Y10T 29/4966;
(Continued)

(56) References Cited

U.S. PATENT DOCUMENTS 4,886,392 A * 12/1989 Iio .......................... B23P 11/00
29/525
6,234,037 B1    5/2001 Zimmer
(Continued)

FOREIGN PATENT DOCUMENTS

DE    196 37 361    3/1998
EP    1 326 032    7/2003
(Continued)

OTHER PUBLICATIONS

International Search Report issued by the European Patent Office in International Application PCT/EP2013/056050.

*Primary Examiner* — Joshua J Michener
*Assistant Examiner* — Kyle Walraed-Sullivan
(74) *Attorney, Agent, or Firm* — Henry M. Feiereisen, LLC

(57) ABSTRACT

A geared motor series includes several motors with different dimensions, which respectively have a motor shaft with a receiving bore on the free end thereof. The nominal outer diameters of the motor shafts of the individual motor dimensions are different from each other. At least one plug-in pinion having a pinion journal is provided with a nominal outer diameter corresponding to the nominal diameter of one of the receiving bores, such that the push-in pinion is fixable to the corresponding motor shaft using a press assembly. The nominal diameter of a receiving bore of a motor shaft of a motor of a first motor dimension corresponds to the nominal diameter of a receiving bore of a motor shaft of a motor of at least one other motor dimension, such that the at least one (Continued)

push-in pinion is fixable to motor shafts of motors having different dimensions using a press assembly.

3 Claims, 4 Drawing Sheets

(51) Int. Cl.
*F16H 57/033* (2012.01)
*F16H 57/02* (2012.01)

(58) Field of Classification Search
CPC .......... F16D 1/072; F16H 2057/02069; F16H 2057/0335; F16H 57/0025; F16B 2001/203
USPC ... 403/359.1, 359.2, 359.4, 359.6, 298, 361; 464/182
See application file for complete search history.

(56) References Cited

U.S. PATENT DOCUMENTS

| | | | |
|---|---|---|---|
| 6,328,655 | B1 | 12/2001 | Zimmermann |
| 7,387,462 | B2* | 6/2008 | Hacker .................. F16D 1/072 403/359.1 |
| 8,176,806 | B2 | 5/2012 | Boeing et al. |
| 8,398,327 | B2* | 3/2013 | Lang ...................... B23P 11/00 29/525 |
| 9,387,544 | B2* | 7/2016 | Phebus ................ B23F 17/001 |
| 2004/0038766 | A1 | 2/2004 | Yamasaki |
| 2006/0053965 | A1 | 3/2006 | Wittenstein |
| 2006/0075838 | A1 | 4/2006 | Hacker |
| 2009/0133521 | A1 | 5/2009 | Kunert |

FOREIGN PATENT DOCUMENTS

| | | |
|---|---|---|
| WO | WO 99/06743 | 2/1999 |
| WO | WO 03/100278 | 12/2003 |
| WO | WO 2004/005763 | 1/2004 |

* cited by examiner

GEARED MOTOR SERIES

CROSS-REFERENCES TO RELATED APPLICATIONS

This application is the U.S. National Stage of International Application No. PCT/EP2013/056050, filed Mar. 22, 2013, which designated the United States and has been published as International Publication No. WO 2013/156248 and which claims the priority of European Patent Application, Serial No. 12164440.5, filed Apr. 17, 2013, pursuant to 35 U.S.C. 119(a)-(d).

BACKGROUND OF THE INVENTION

The present invention relates to a geared motor series comprising a plurality of motors with different dimensions, which respectively comprise a motor shaft provided with a receiving bore on the free end thereof, with the nominal external diameters of the motor shafts of the individual motor dimensions being different from each other, and also comprising at least one plug-in pinion which comprises a pinion journal, the nominal external diameter of which matching the nominal diameter of one of the receiving bores, such that the plug-in pinion can be fixed to the corresponding motor shaft using a press assembly. A plug-in pinion denotes a toothed part whose pinion journal is assembled by means of a press assembly in the receiving bore provided at the end of the motor shaft. A plug-in pinion is therefore the combination of a toothing required for the geared motor series and a journal required for assembly in one component. A fundamental advantage of this type of connection is that toothing parts can be attached which are equal to or even smaller in outer diameter than the nominal external diameter of the end of the motor shaft. Very high transmissions are therefore possible in the first motor-side transmission stage.

Geared motor series of the type described in the introduction are already known in the prior art. Very high variance in the transmissions of each gear is primarily achieved by way of a large number of transmissions in the first motor-side transmission stage. Intermediate and end stages of a gear on the other hand tend to have low variance. The total number of toothed parts required is therefore principally shaped by the first stage. Known geared motor series accordingly have a plurality of plug-in pinions for each motor dimension that can be produced with them, with the nominal external diameter of the pinion journals and the motor shaft journals always being designed by taking into account the nominal external diameter of the associated motor shaft, so journals with different motor dimensions normally have different nominal external diameters. For this reason embodiments result in which a plurality of pinion journals and/or receiving bores are associated with the same pinion toothing for assembly on motor shafts with different dimensions, and this leads to a correspondingly high number of plug-in pinions and/or push-on pinions.

SUMMARY OF THE INVENTION

Starting from this prior art it is an object of the present invention to create a geared motor series of the type mentioned in the introduction which has a low number of individual components.

To achieve this object the present invention creates a geared motor series comprising a plurality of motors with different dimensions, which respectively comprise a motor shaft provided with a receiving bore on the free end thereof, with the nominal external diameters of the motor shafts with the individual motor dimensions being different from each other, and also comprising at least one plug-in pinion which comprises a pinion journal, the nominal external diameter matching the nominal diameter of one of the receiving bores, such that the plug-in pinion can be fixed to the corresponding motor shaft using a press assembly, characterized in that the nominal diameter of a receiving bore of a motor shaft of a motor with a first dimension matches the nominal diameter of a receiving bore of a motor shaft of a motor with at least one other motor dimension, such that the at least one plug-in pinion can be fixed to motor shafts of motors having different dimensions using a press assembly. In other words, the number of components is reduced with this inventive geared motor series in that the nominal diameter of the receiving bores provided on the end of the motor shafts are selected in such a way that plug-in pinions with identical pinion journals can be used for motors with different dimensions. Therefore receiving bores with an identical nominal diameter are chosen by way of example for motor shafts with successive dimensions.

According to one embodiment of the present invention the nominal diameter of the mutually corresponding receiving bores are selected in such a way that the portion of the plastically stressed annular surface of the overall cross-section of the outer part of the press assembly is always less than or equal to 0.3 irrespective of the motor dimensions. In other words, the following should apply: $q_{PA}/q_A \leq 0.3$, with $q_{PA}$ being the plastically stressed annular surface of the outer part and $q_A$ being the annular surface of the outer part. Reference is made to the calculation of press assemblies to DIN 7190 in relation to the calculation.

The pinion journal preferably has a nominal external diameter which ensures a shaft strength sufficient for proper transmission of the required torque. In other words, the nominal external diameter of the pinion journal or the shaft journal is chosen in such a way that failure due to the loads to be anticipated during subsequent operation is reliably counteracted. Reference is made to DIN 743 in relation to the calculation of the shaft strength.

BRIEF DESCRIPTION OF THE DRAWING

Further features and advantages of the present invention will become clear with the aid of the following description of an embodiment of an inventive geared motor series which makes reference to the accompanying drawings, in which.

DETAILED DESCRIPTION OF PREFERRED EMBODIMENTS

The construction of an inventive geared motor series will be explained below using a comparison with a known geared motor series and with reference to the accompanying drawings.

Figure 1:
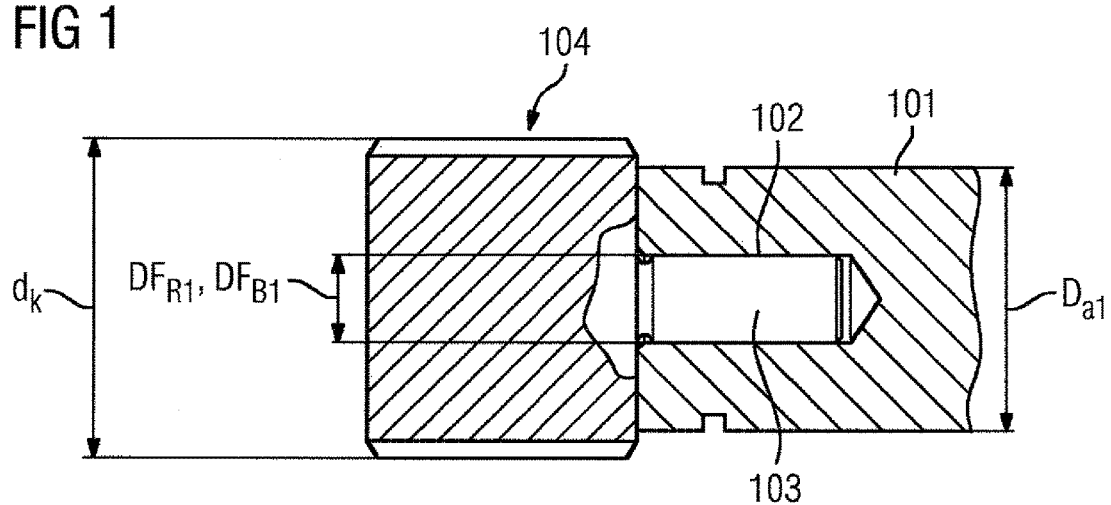
FIG. 1 shows a schematic cross-section of a motor shaft with a first dimension of a known geared motor series with a plug-in pinion mounted thereon.
Figure 2:
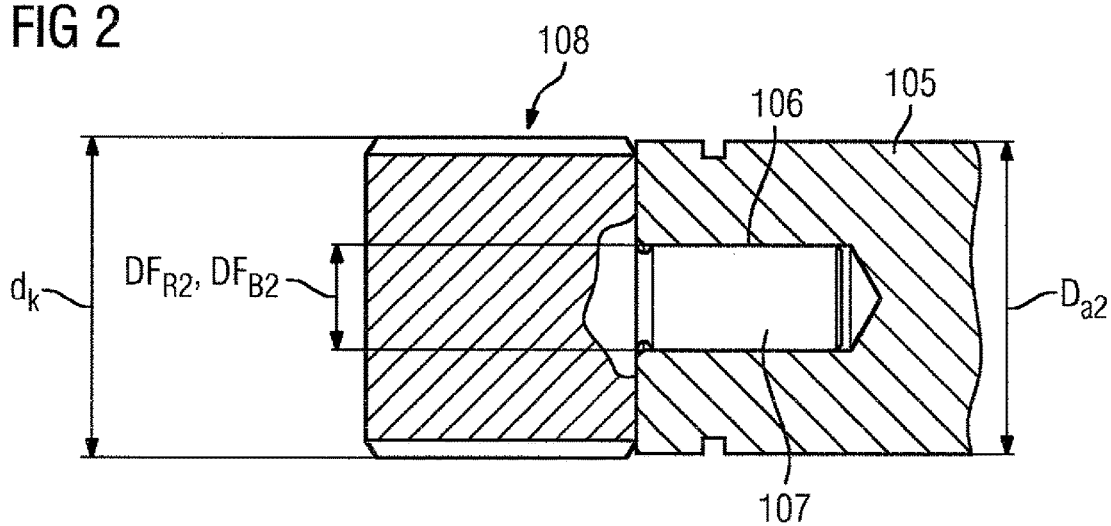
FIG. 2 shows a schematic cross-section of a motor shaft with a further dimension of the known geared motor series with a plug-in pinion mounted thereon.

FIGS. 1 and 2 show schematic cross-sections of the motor shafts with dimensions 80 and 90 of a known geared motor series with plug-in pinions mounted thereon.

More precisely, FIG. 1 shows a motor shaft 101 with dimension 80, with the motor shaft 101 having a nominal external diameter $D_{a1}$ of 24.8 mm. The end face of the free end of the motor shaft 101 is provided with a receiving bore 102 which has a nominal diameter $DF_{B1}$ of 10 mm. Fixed in the receiving bore 102 using a press assembly is a pinion journal 103 of a plug-in pinion 104, and this forms the first motor-side transmission stage of a gear of the known geared motor series. The pinion journal 103 has a nominal external diameter $DF_{R1}$ which matches the nominal diameter $DF_{B1}$ of the receiving bore 102 and is therefore also 10 mm.

FIG. 2 shows a motor shaft 105 with the next larger motor dimension 90 of the known geared motor series, with the motor shaft 105 having a nominal external diameter $D_{a2}$ of 29.8 mm. The end face of the free end of the motor shaft 105 is provided with a receiving bore 106 whose nominal diameter $DF_{B2}$ is 12 mm. Fixed in the receiving bore 106 using a press assembly is a pinion journal 107 of a plug-in pinion 108 whose outside diameter $d_k$ matches that of the plug-in pinion 104. The nominal diameter $DF_{R2}$ of the pinion journal 107 matches the nominal diameter $DF_{B2}$ of the receiving bore 106 and is therefore also 12 mm.

Although the teeth of the plug-in pinions 104 and 108 are identical, owing to the different nominal diameters of the pinion journals 103 and 107, in the known series for motor dimensions 80 and 90 separate pinion journals are required therefore since the nominal diameters $DF_{B1}$ and $DF_{B2}$ of the receiving bores 102 and 106 are adapted to the different nominal external diameters $D_{a1}$ and $D_{a2}$ of the motor shafts 101 and 105 in relation to an optimum transmission capacity of the press fit according to DIN 7190 when considered individually in each case. In other words, the nominal diameters $DF_{B1}$ and $DF_{B2}$ have each been ascertained separately from each other within the framework of an individual calculation according to DIN 7190 in order to achieve an optimized press fitting.

The present invention is accordingly based on the idea that the separate allocation of the plug-in pinion journals 103 and 107 to the respective motor dimension is not imperative in geared motor series in order to achieve a reliable press assembly. Instead, certain motor dimensions may be combined into groups in which the use of just a single shared journal geometry works in each case.

This is achieved with plug-in pinions if, in the case of a relatively large motor of a group, the selected maximum admissible portion of the plastically stressed annular surface $q_{P4}$ of the overall cross-section $q_A$ is not fully utilized according to DIN 7190. This is typically identified by a limiting ratio $q_{P4}/q_A$ of less than 0.3. Correspondingly smaller motors therefore exhibit a higher utilization of the set limiting ratio. A constant oversize is firstly assumed in this connection. A change in the tolerance of the motor shaft bore can also be used. The smaller motors of a group usually generate less torque, so a correspondingly lower coverage is sufficient. Identical pinion journal diameters can therefore also be implemented in a motor group if the available plasticity diameter has already been used in the case of a motor at full capacity.

This is illustrated below with reference to FIGS. 3 to 5 which refer to a geared motor series according to one embodiment of the present invention, and with reference to FIG. 6 which contrasts the known geared motor series and the inventive geared motor series.

Figure 3:
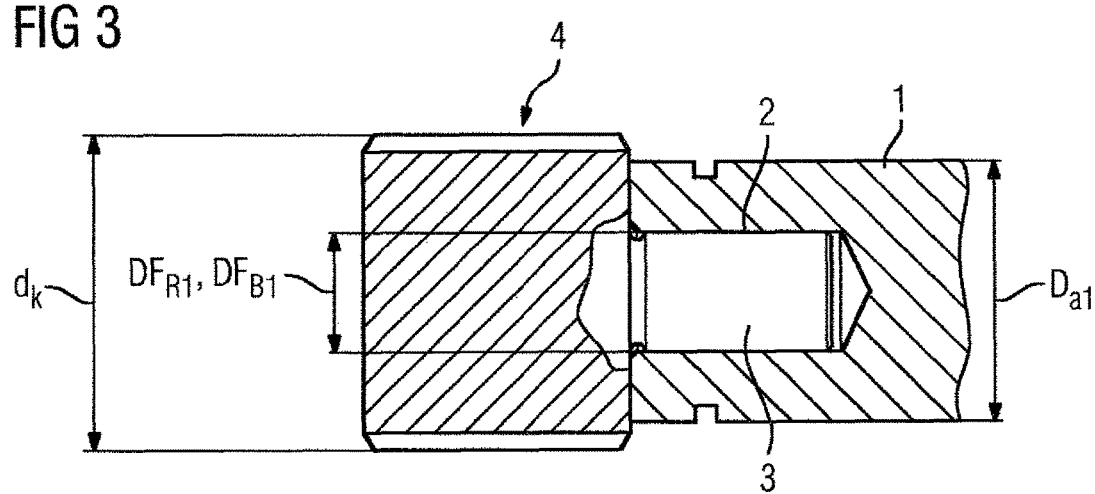
FIG. 3 shows a schematic cross-section of a motor shaft with a first dimension of an inventive geared motor series with a plug-in pinion mounted thereon.

FIG. 3 shows a motor shaft 1 with the dimension 80 of the inventive geared motor series, with the nominal external diameter $D_{a1}$ of the motor shaft 1 being 24.8 mm analogously to the known example shown in FIG. 1. The motor shaft 1 is provided at its free end with a receiving bore 2 which has a nominal diameter $DF_{B1}$ of 14 mm and is therefore chosen to be bigger than the nominal diameter $DF_{B1}$ of the receiving bore 102 shown in FIG. 1. Fixed in the receiving bore 2 using a press assembly is a pinion journal 3 of a plug-in pinion 4, with the nominal diameter $DF_{R1}$ of the pinion journal 3 matching the nominal diameter $DF_{B1}$ of the receiving bore 2 and therefore also being 14 mm. The portion of the plastically stressed annular surface on the overall cross-section of the total outer part of the press assembly $q_{P4}/q_A$ is, as a function of the chosen oversizes in the example, calculated according to DIN 7190, in the present case 0.295. It is therefore smaller than 0.3 and accordingly (only just) reliable.

Figure 4:
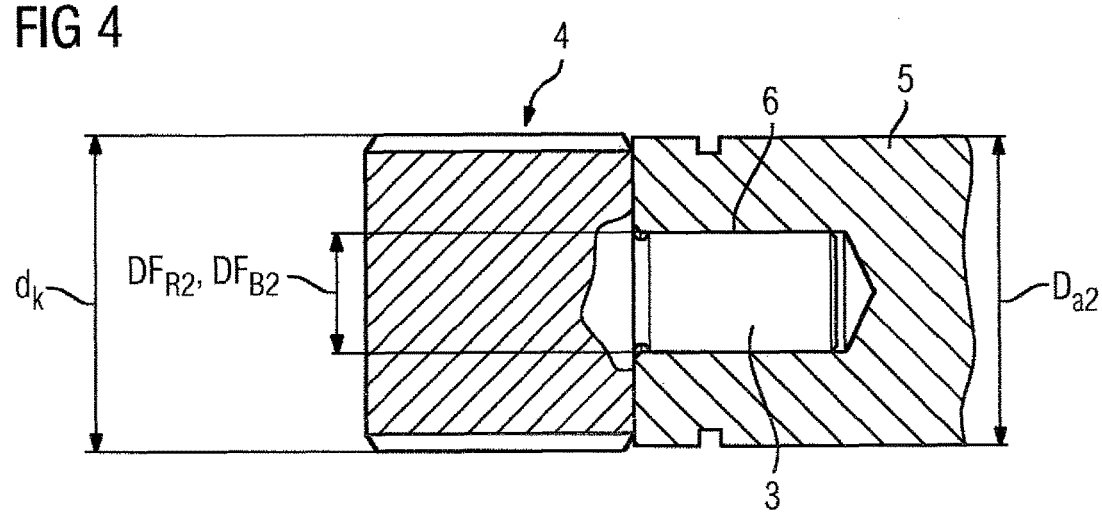
FIG. 4 shows a schematic cross-section of a motor shaft with a further dimension of the inventive geared motor series with a plug-in pinion mounted thereon.

FIG. 4 shows a motor shaft 5 of the next larger dimension 90 of the inventive geared motor series, with the nominal external diameter $D_{a2}$ of the motor shaft 5 being 29.8 mm and therefore matching the nominal external diameter $D_{a2}$ of the motor shaft, shown in FIG. 2, of the known geared motor series. The free end of the motor shaft 5 is provided at its end face with a receiving bore 6 which has a nominal diameter $DF_{B2}$ of 14 mm and therefore matches the nominal diameter $DF_{B1}$ of the receiving bore 2 of the motor shaft 1, shown in FIG. 3, with dimension 80. A pinion journal 3 of a plug-in pinion 4 is mounted in the receiving bore 6 using a press assembly. The nominal external diameter $DF_{R2}$ of the plug-in pinion 8 matches the nominal diameter $DF_{B2}$ and is therefore also 14 mm. A value of 0.179, which is likewise smaller than 0.3 and therefore admissible, results for the portion of the plastically stressed annular surface on the overall cross-section of the outer part of the press assembly with the same oversizes in the example chosen above.

Due to the fact that the nominal diameters $DF_{R1}$, $DF_{R2}$, $DF_{B1}$ and $DF_{B2}$ in the inventive geared motor series are chosen to be identical for motor dimensions 80 and 90, plug-in pinions 4 with identical pinion journals 3 can be used for the dimensions 80 and 90, whereby the number of components can be reduced compared to the motor dimensions 80 and 90 of the known geared motor series. This leads to considerable cost savings.

Figure 5:
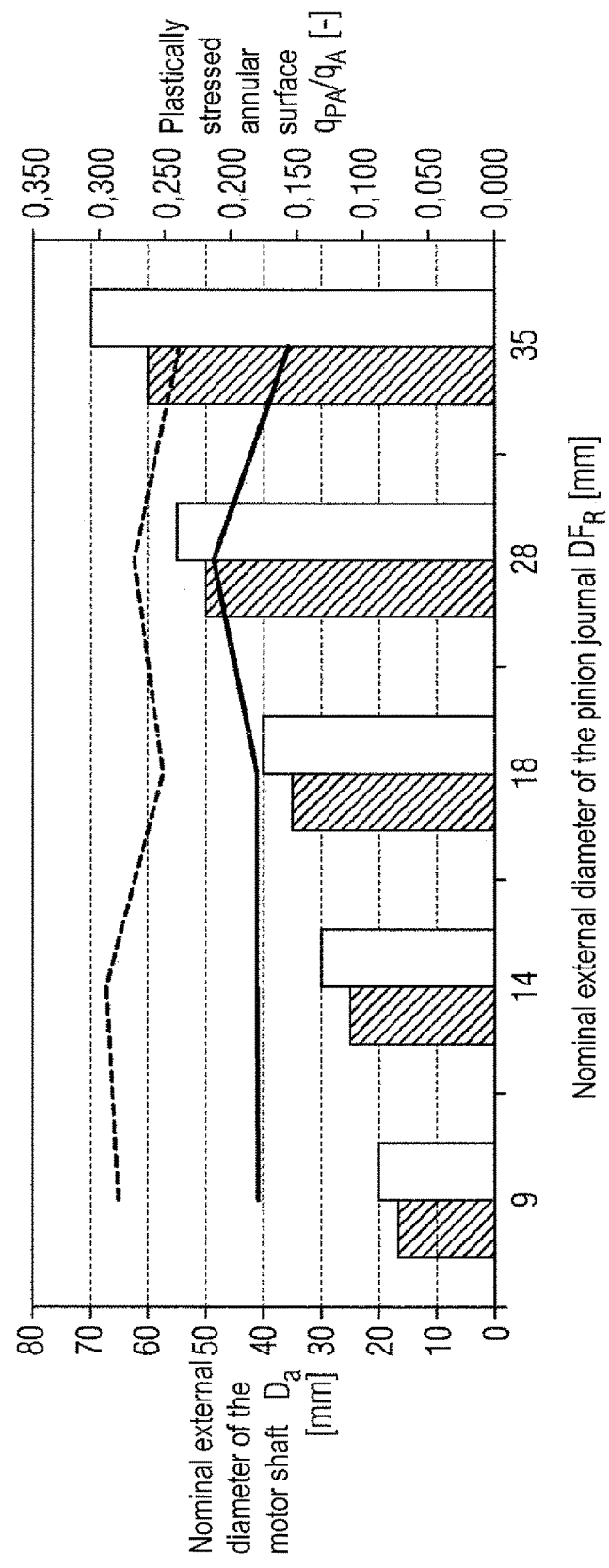
FIG. 5 shows a graph with reference to which the inventive geared motor series will be explained.

Similarly, as is shown by FIG. 5, the plug-in pinions are combined for the motor dimensions 100 and 112, 132 and 160 and 180 and 200. In FIG. 5 the hatched bars represent the smaller motor of two combined motor dimensions respectively. The non-hatched bars represent the larger motor of two combined motor dimensions. The broken line represents the portion of the plastically stressed annular surface of the overall cross-section of the outer part of the press assembly $q_{P4}/q_A$ of the smaller motor of two combined motor dimensions and the solid line represents the value for $q_{P4}/q_A$ for the larger motor of two combined motor dimensions.

Figure 6:
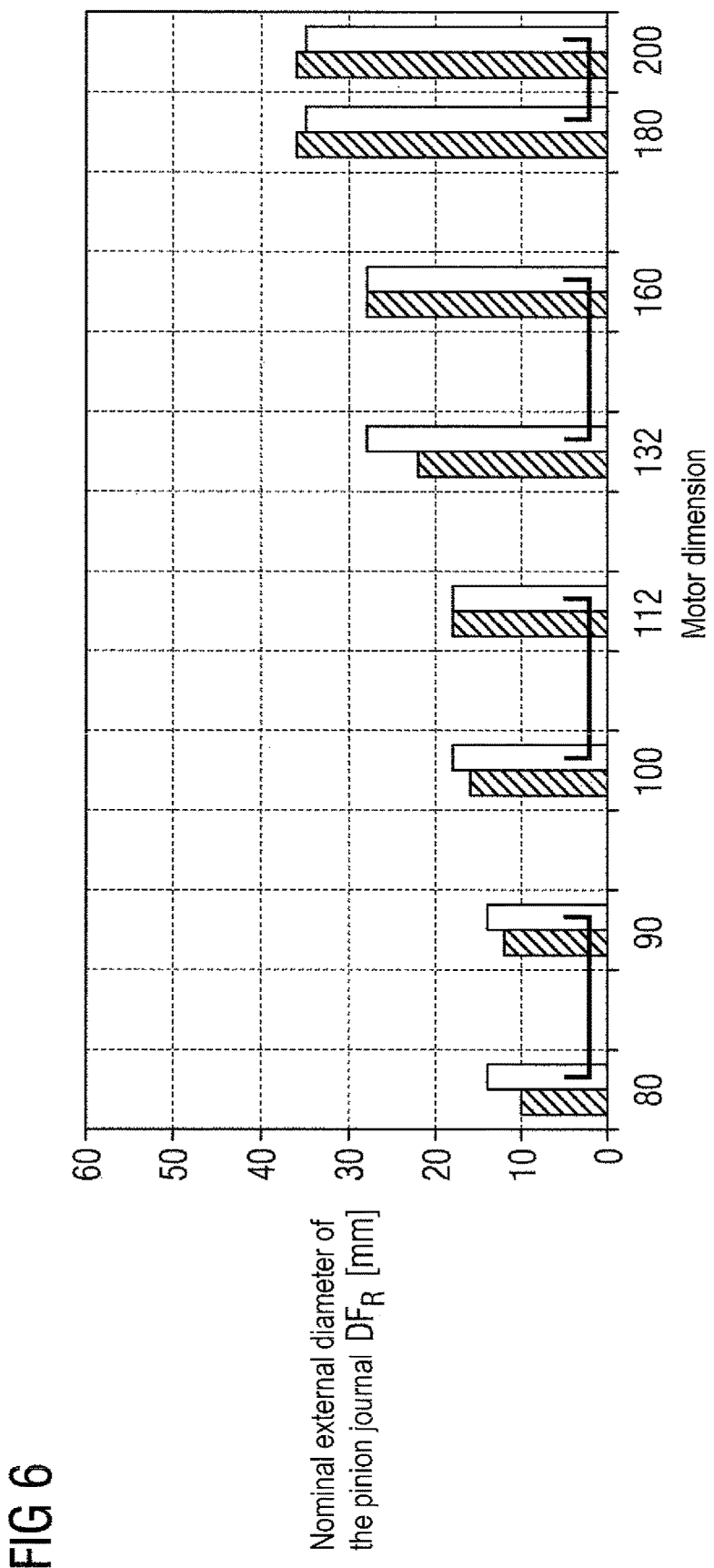
FIG. 6 shows a graph with reference to which the difference between the inventive geared motor series and the known geared motor series will be explained.

FIG. 6 shows a direct comparison of the nominal external diameters $DF_R$ of the pinion journals of the plug-in pinions of the known geared motor series shown in FIGS. 1 and 2 for the motor dimensions 80, 90, 100, 112, 132, 160, 180 and 200 and the nominal external diameters $DF_R$ of the pinion journals of the plug-in pinions of the known geared motor series shown in FIGS. 3 and 4 for the same motor dimensions. The hatched bars in the chart represent the nominal external diameters $DF_R$ of the pinion journals of the plug-in pinions of the known geared motor series and the non-hatched bars represent the nominal external diameters $DF_R$ of the pinion journals of the plug-in pinions of the inventive geared motor series. It can be seen that, compared to the known geared motor series, one plug-in pinion is spared for each motor dimension in the case of the inventive geared motor series.

Although the invention has been illustrated and described in detail by the preferred exemplary embodiment, it is not limited by the disclosed examples and a person skilled in the art can derive other variations herefrom without departing from the scope of the invention.

The invention claimed is:

1. A geared motor series, comprising:
   a plurality of motors with different dimensions, each said motor including a motor shaft defined by a nominal external diameter and having a receiving bore of a nominal diameter on a free end, wherein the nominal external diameters of the motor shafts are different from each other, while the nominal diameters of the receiving bores of at least two of the motor shafts having different external nominal diameters match each other; and
   at least one plug-in pinion having a pinion journal defined by a nominal external diameter matching the nominal diameter of the receiving bores with the matching nominal diameters, such that the same plug-in pinion is fixable to a corresponding one of the motor shafts by introducing its same pinion journal into the receiving bore of any of the motor shafts having different nominal external diameters and using a press assembly.

2. The geared motor series of claim 1, wherein the pinion journal has a nominal external diameter dimensioned to ensure a shaft strength for transmission of a required torque.

3. The geared motor series of claim 1, wherein the nominal diameters of the receiving bores of the at least two of the motor shafts having different external nominal diameters are equal to each other, and the nominal external diameter of the pinion journal is equal to the equal nominal diameters of the receiving bores of the at least two of the motor shafts having different external nominal diameters.

* * * * *